US012625232B2

(12) United States Patent (10) Patent No.: US 12,625,232 B2

Belokurov et al. (45) Date of Patent: May 12, 2026

(54) CALIBRATION PROCESS FOR VEHICULAR RADAR SENSING SYSTEM

(71) Applicant: Magna Electronics Inc., Auburn Hills, MI (US)

(72) Inventors: Denis Belokurov, Munich (DE); Sebastian Breunig, Mespelbrunn (DE); Alexej Bohr, Blankenbach (DE)

(73) Assignee: Magna Electronics Inc., Auburn Hills, MI (US)

( * ) Notice: Subject to any disclaimer, the term of this patent is extended or adjusted under 35 U.S.C. 154(b) by 280 days.

(21) Appl. No.: 18/505,436

(22) Filed: Nov. 9, 2023

(65) Prior Publication Data

US 2024/0159866 A1 May 16, 2024

Related U.S. Application Data

(60) Provisional application No. 63/385,651, filed on Dec. 1, 2022, provisional application No. 63/383,299, filed on Nov. 11, 2022.

(51) Int. Cl.
*G01S 7/40* (2006.01)

(52) U.S. Cl.
CPC ............ *G01S 7/4026* (2013.01); *G01S 7/403* (2021.05); *G01S 7/4034* (2021.05)

(58) Field of Classification Search
None
See application file for complete search history.

(56) References Cited

U.S. PATENT DOCUMENTS

| | | | | |
|---|---|---|---|---|
| 5,977,906 A | * | 11/1999 | Ameen | ................. G01S 13/931 |
| | | | | 342/174 |
| 6,020,844 A | * | 2/2000 | Bai | ........................ G01S 7/4026 |
| | | | | 342/75 |
| 6,437,731 B1 | | 8/2002 | Henrio et al. | |
| 6,690,354 B2 | | 2/2004 | Sze | |
| 6,710,770 B2 | | 3/2004 | Tomasi et al. | |
| 6,778,131 B2 | * | 8/2004 | Haney | ................... G01S 13/931 |
| | | | | 343/703 |
| 6,876,775 B2 | | 4/2005 | Torunoglu | |

(Continued)

FOREIGN PATENT DOCUMENTS

| | | | | |
|---|---|---|---|---|
| GB | 2334842 A | * | 9/1999 | ........... G01S 13/931 |

OTHER PUBLICATIONS

Entry for "dispose" in the Merriam-Webster.com Dictionary; accessed on Oct. 14, 2025. (Year: 2025).*

*Primary Examiner* — Bernarr E Gregory

(74) *Attorney, Agent, or Firm* — HONIGMAN LLP

(57) ABSTRACT

A method for calibrating a radar system includes disposing the radar sensor at a vehicle and disposing an object at a first location relative to the vehicle. Using sensor data captured by the radar sensor with the object at the first location, a first location of the object relative to the radar sensor is determined. The object is moved along an intended principal axis of sensing for the radar sensor from the first location to a second location. Using sensor data captured by the radar sensor with the object at the second location, a second location of the object relative to the radar sensor is determined. Using the first determined location of the object and the second determined location of the object, a misalignment of the radar sensor is determined. The radar system is calibrated based at least in part on the misalignment.

20 Claims, 3 Drawing Sheets

(56)  References Cited

U.S. PATENT DOCUMENTS

| | | | |
|---|---|---|---|
| 6,900,755 B2 * | 5/2005 | Richardson | G01S 7/4026 342/107 |
| 6,906,793 B2 | 6/2005 | Bamji et al. | |
| 6,919,549 B2 | 7/2005 | Bamji et al. | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,689,967 B1 | 6/2017 | Stark et al. | |
| 9,753,121 B1 | 9/2017 | Davis et al. | |
| 9,954,955 B2 | 4/2018 | Davis et al. | |
| 10,816,666 B2 | 10/2020 | Nicke et al. | |
| 10,866,306 B2 | 12/2020 | Maher et al. | |
| 10,884,103 B2 | 1/2021 | Pliefke et al. | |
| 11,391,826 B2 | 7/2022 | Singh | |
| 11,555,888 B2 | 1/2023 | Pliefke et al. | |
| 2007/0182623 A1 * | 8/2007 | Zeng | G01S 13/931 342/174 |
| 2011/0285571 A1 | 11/2011 | Jeong et al. | |
| 2013/0088382 A1 | 4/2013 | Lee et al. | |
| 2014/0347206 A1 * | 11/2014 | Steinlechner | G01S 7/4026 342/5 |
| 2015/0301159 A1 * | 10/2015 | Scheschko | G01S 7/4026 342/174 |
| 2016/0178733 A1 * | 6/2016 | Langendorf | G01S 13/88 342/167 |
| 2016/0334511 A1 | 11/2016 | Ling | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0052223 A1 | 2/2018 | Stieff et al. | |
| 2018/0203097 A1 | 7/2018 | Park | |
| 2018/0231635 A1 | 8/2018 | Woehlte | |
| 2019/0339382 A1 | 11/2019 | Hess et al. | |

* cited by examiner

CALIBRATION PROCESS FOR VEHICULAR RADAR SENSING SYSTEM

CROSS REFERENCE TO RELATED APPLICATIONS

The present application claims priority of U.S. provisional application Ser. No. 63/385,651, filed Dec. 1, 2022, and U.S. provisional application Ser. No. 63/383,299, filed Nov. 11, 2022, which are hereby incorporated herein by reference in their entireties.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A method for calibrating a vehicular radar system includes disposing a radar sensor of the vehicular radar system at a vehicle. The radar sensor senses exterior of the vehicle and has a principal axis of sensing. The radar sensor has a misalignment representing a difference between the principal axis of sensing of the radar sensor and an intended principal axis of sensing for the radar sensor. The method includes disposing an object at a first location relative to the radar sensor on the intended principal axis of sensing for the radar sensor. The first location has a first distance between the object and the radar sensor. The method includes capturing, via the radar sensor, sensor data with the object at the first location. The method also includes determining, via processing by a data processor of sensor data captured by the radar sensor with the object at the first location, a first sensed location of the object relative to the radar sensor. The method includes moving the object along the intended principal axis of sensing for the radar sensor from the first location to a second location relative to the radar sensor. The second location has a second distance between the object and the radar sensor that is different than the first distance between the object and the radar sensor. The method includes capturing, via the radar sensor, sensor data with the object at the second location. The method also includes determining, via processing by the data processor of sensor data captured by the radar sensor with the object at the second location, a second sensed location of the object relative to the radar sensor. The method also includes determining the misalignment of the radar sensor based at least in part on the first sensed location of the object and the second sensed location of the object. The method includes calibrating the vehicular radar system based at least in part on the determined misalignment of the radar sensor.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
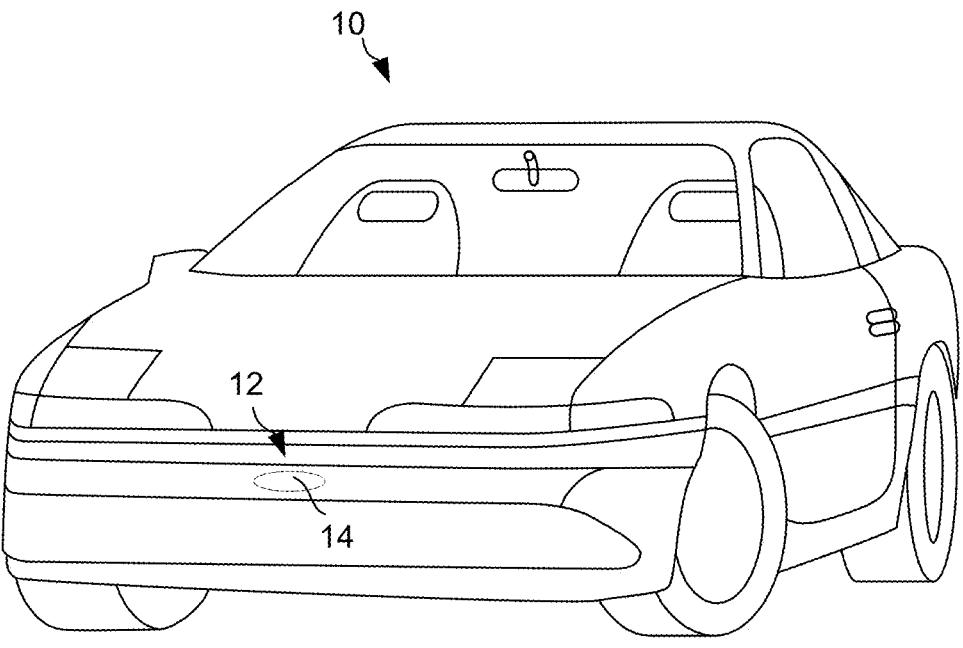
FIG. 1 is a perspective view of a vehicle with a sensing system that incorporates a radar sensor.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, one or more corner sensing sensors such as corner-mounted radar sensors, and/or a sideward/rearward facing sensor at respective sides of the vehicle), which sense regions exterior of the vehicle. The sensing system 12 includes a control or electronic control unit (ECU) that includes a data processor that is operable to process data captured by the radar sensor(s). The sensing system may also include a radar sensor that includes a plurality of transmitters that transmit radio signals via a plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controlling at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

When installing/mounting a radar sensor or module to a vehicle, orientation of the field of sensing of the radar sensor may deviate from nominal orientation up to 10 degrees due to, for example, tolerances of mechanical methods of alignment during vehicle assembly and/or installation difficulties. However, many advanced driver assistance systems (ADAS) require deviations of actual from nominal radar horizontal orientation (i.e., azimuth misalignment) and/or vertical orientation (i.e., elevation misalignment) to be less than 0.5 degrees. Therefore, the radar sensor requires fine azimuth and/or elevation misalignment calibration that can be stored as a correction value in memory (i.e., for each radar sensor mounted at the vehicle). Conventional tools for mechanical measurement of azimuth misalignment or elevation misalignment are difficult to obtain and expensive.

Implementations herein include a radar calibrator that allows azimuth misalignment calibration and/or elevation misalignment calibration of one or more radar sensors to reduce misalignment to less than 0.5 degrees without precise and expensive mechanical measurement equipment. Systems and methods may make use of the radar calibrator using only radar data representative of an object moved along an axis of the vehicle (i.e., radar data representative of the object that is captured by each respective radar sensor) by implementing post-processing of the captured radar data. The radar calibrator may be executed in the vehicle test department, at the end of the vehicle production line, and/or at a point of sale for the vehicle (e.g., at a vehicle dealership). The radar calibrator may be used to periodically recalibrate vehicular sensor systems after manufacture. For example, a repair facility may recalibrate one or more sensors after the vehicle has been in an accident or after the vehicle has been repaired or serviced.

Figure 2:
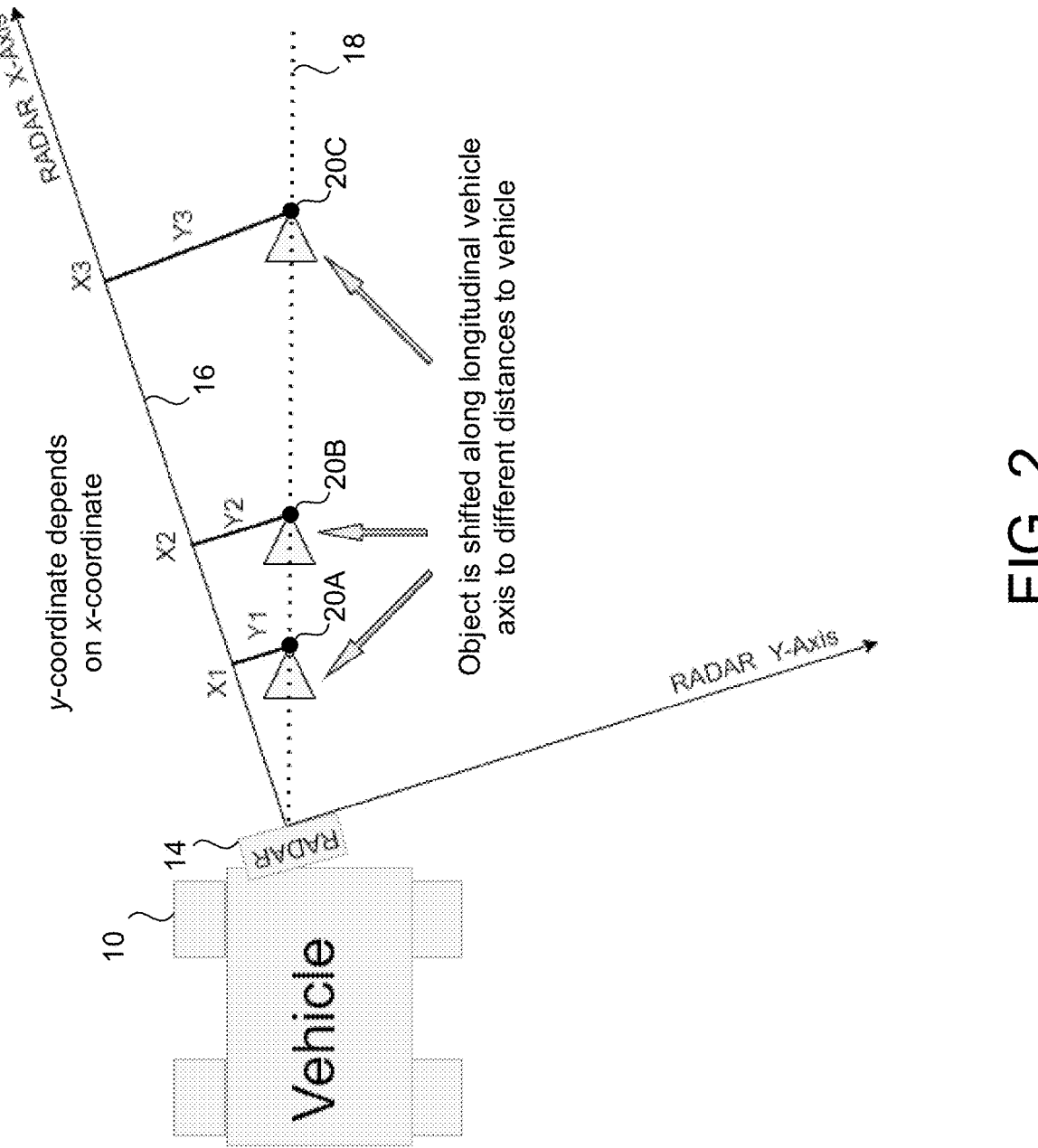
FIG. 2 is a schematic view of a radar calibration system for azimuth calibration of the sensing system of FIG. 1.

Referring now to FIG. 2, in some examples, the radar calibrator performs azimuth calibration to correct for any azimuth misalignment in one or more sensors. In general, the radar calibrator assumes a radar sensor is mounted with an unknown azimuth misalignment to an axis of the vehicle. When an external object is moved (relative to the vehicle) strictly parallel to the vehicle longitudinal axis, the y-coordinate (i.e., the lateral coordinate of a Cartesian coordinate system) of the object (as perceived by the radar sensor) will be dependent on the x-coordinate (i.e., the longitudinal coordinate) of the object in the coordinate system of the radar sensor (i.e., the coordinate system relative to the radar sensor). In this example, the object is moved along a longitudinal axis of the vehicle, as the optimal principal field of sensing of the radar sensor is parallel with the longitudinal axis of the vehicle (e.g., the radar sensor is located at the front of the vehicle and directed forward). In other examples, the object may be moved differently relative to the vehicle based on the sensor's principal field of sensing. For example, a corner radar sensor does not have a principal field of sensing that aligns with the longitudinal axis of the vehicle, and thus the object would be moved relative to the vehicle and radar sensor accordingly.

As shown in FIG. 2, a radar sensor 14 has an unknown amount of azimuth misalignment (i.e., the radar sensor's x-axis or the radar sensor's principal direction of sensing 16 is not parallel to the vehicle longitudinal axis 18). In this case, the y-coordinate of an object (according to the radar sensor frame of reference) that is independent and external from the vehicle depends on the x-coordinate (according to the radar sensor frame of reference) for several measurements at different distances between the vehicle and the object:

$$y_i = x_i \times tg(\propto) + C + n_i \qquad (1)$$

In Equation (1), $y_i$ represents the y-coordinate of the object in the radar sensor frame, $x_i$ represents the x-coordinate of the object in the radar sensor frame, $n_i$ represents a measurement noise, i represents an experiment index, $tg(\propto)$ represents the tangent of angular misalignment of the radar sensor from an imaginary line parallel to the longitudinal vehicle axis, and C represents a constant offset. Using Equation (1) for an object at different distances from the vehicle builds a linear system for measuring misalignment, which can be solved for using a=tg(∝) and C. That is, azimuth misalignment ($\propto_a$) may be obtained from:

$$\propto_a = a\tan(a) \qquad (2)$$

Using equations (1) and (2), the minimal number of different distances required for resolution is two. That is, the object must be detected/measured at two or more different distances from the vehicle/radar sensor. For example, in FIG. 2, the object is measured by the radar sensor 14 of the vehicle 10 when the object is at each of the locations 20A, 20B, 20C. When the object is measured at location 20A, the object has, in the vehicle's or radar sensor's coordinate system, a location of X1, Y1. Similarly, when the object is at location 20B relative to the vehicle 10, the object has a location X2, Y2 and when the object is at location 20C, the object has a location of X3, Y3. That is, due to the azimuth misalignment of the radar sensor 14, as the object moves relative to the vehicle parallel to the longitudinal axis of the vehicle (i.e., parallel along the x-axis of the vehicle), the object's location changes both laterally and longitudinally (represented by changes in both the x-coordinate and the y-coordinate). Notably, in this example, if the radar sensor had no azimuth misalignment, an object that moves along the longitudinal axis of the vehicle would have an x-coordinate in the radar sensor's coordinate system that changes but a y-coordinate that does not change.

A linear system with two equations (i.e., when the object is measured at two different locations) can be solved analytically to determine an azimuth misalignment factor. Linear systems with greater than two equations (i.e., when the object is measured at three or more different locations) is overdetermined and may be solved numerically to determine the azimuth misalignment factor. Numerical solution of overdetermined systems minimizes influence of measurement noise. Thus, larger numbers of equations (i.e., measuring the object at more locations relative to the radar sensor and solving the resulting linear system) results in better noise suppression. Accordingly, the object may be measured at any number of locations relative to the vehicle with a tradeoff between accuracy and test complexity. The azimuth misalignment factor may be used to calibrate the radar sensor. For example, the azimuth misalignment factor is stored in memory disposed at the vehicle and is used to compensate for the azimuth misalignment by processing radar data captured by the radar sensor in accordance with the azimuth misalignment factor. Optionally, the system saves/stores all data in memory of the radar sensor and processes the data using embedded software executed by the radar sensor.

The radar calibrator system may include a single physical target (e.g., a radar-reflective object easily detected by the radar sensor) that is moved relative to the vehicle, and the system captures radar sensor data of the target at each of two or more different locations. Additionally or alternatively, the vehicle may be moved relative to the target while the radar sensor data is captured. For example, the target may be fixed at the end of an assembly line during manufacture of the vehicle and the vehicle may be moved toward or away from the target. Optionally, the system may include multiple physical targets, each spaced a different distance from the vehicle and the radar sensor may capture data for multiple targets at the same time. Different targets may be used to calibrate different sensors on the vehicle depending on the location and orientation of the radar sensor relative to the vehicle. Alternatively, the objects may be moved relative to the vehicle or the orientation of the vehicle may be altered to calibrate different sensors of the vehicle.

Optionally, the radar calibrator uses one or more virtual targets (e.g., via a virtual radar target generator) in addition to or alternative to physical targets/objects to determine the azimuth misalignment factor. The virtual targets mimic or simulate physical targets at different distances. The use of virtual targets may avoid requiring manual preparation/ movement (e.g., by an operator or calibrator) of physical targets and/or the vehicle. Optionally, the system includes a fixed physical target and virtual targets to simulate movement of the fixed physical target. A virtual target generator may be used to emit/transmit radio waves to simulate, to the radar sensor(s), movement of a physical target. For example, the virtual target generator emits radio waves that match radio waves an actual physical moving target would reflect back to the radar sensor. This allows for automatic collection and processing of a large number of measurements and thus significantly increases accuracy while reducing the time needed for the calibration procedure.

Figure 3:
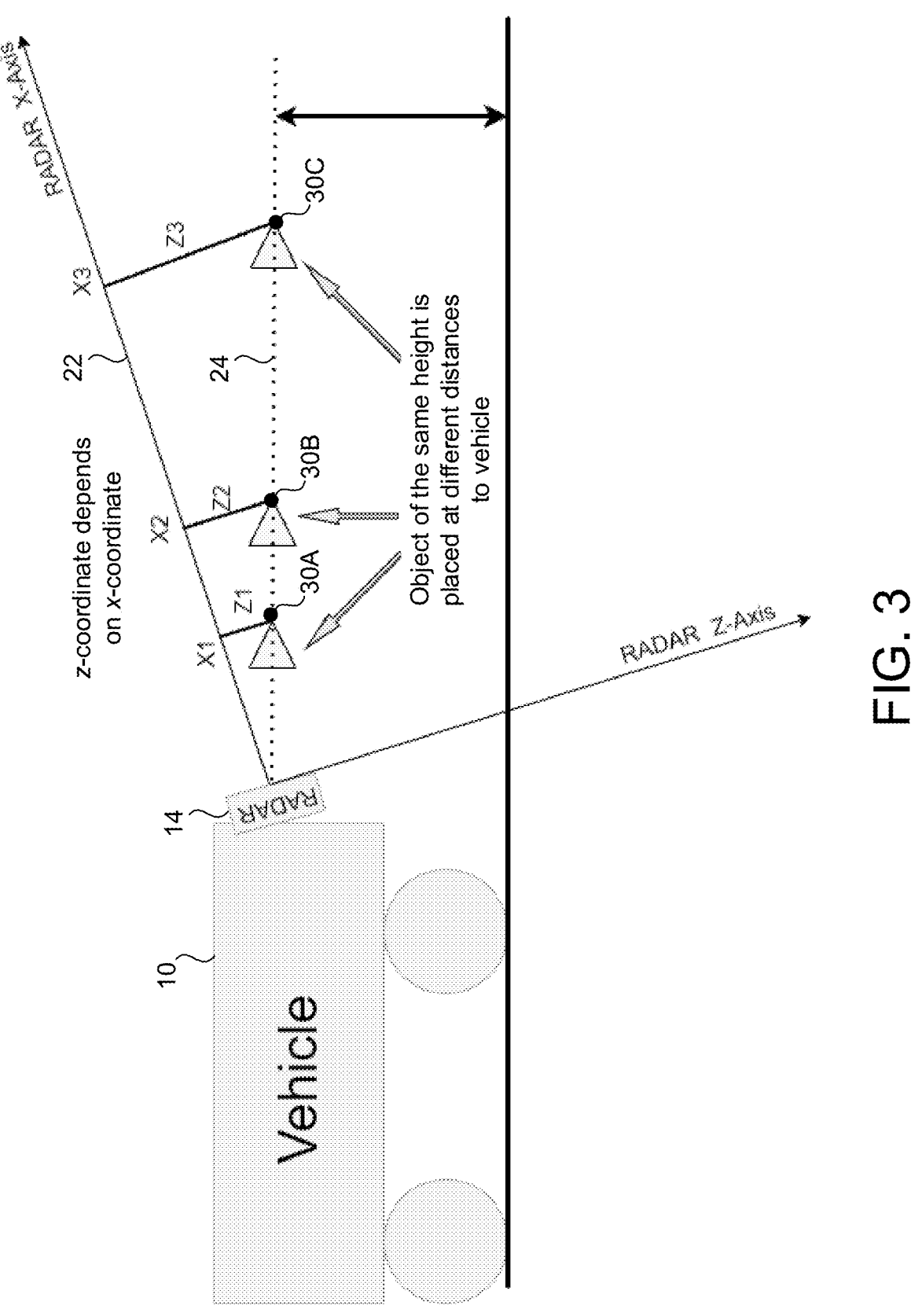
FIG. 3 is a schematic view of a radar calibration system for elevation calibration of the sensing system of FIG. 1.

Referring now to FIG. 3, in some implementations, the radar calibrator alternatively or additionally calibrates or corrects vertical orientation and/or elevation misalignment of one or more radar sensors. As discussed with reference to azimuth misalignment, installation of radar sensors can lead up to ten degrees of elevation misalignment, while many sensitive ADAS functions can only tolerate up to 0.5 degrees of misalignment. Conventionally, expensive equipment is used to perform mechanical measurements of elevation misalignment to generate an elevation misalignment factor that is stored at the vehicle (e.g., as a correction value) to calibrate the radar sensor.

As with azimuth misalignment, the radar calibrator may allow elevation misalignment calibration of one or more radar sensors to reduce misalignment to less than 0.5 degrees without precise and expensive mechanical measurement equipment. Systems and methods may make use of the radar calibrator using only radar data of an object moved along an axis of the vehicle (i.e., radar data captured by each respective radar sensor of the object) by implementing simple post-processing of the captured radar data. The radar calibrator may be executed in the vehicle test department, at the end of the vehicle production line, and/or at a point of sale for the vehicle (e.g., at a vehicle dealership).

As shown in FIG. 3, in some examples, the radar calibrator performs elevation calibration to correct for any elevation misalignment in one or more sensors. In general, the radar calibrator assumes a radar sensor is mounted with an unknown elevation misalignment to an axis of the vehicle. When an object is moved (relative to the vehicle) parallel to the ground (i.e., along a fixed height), the z-coordinate (i.e., the vertical coordinate of a Cartesian coordinate system associated with the sensor) of the object will be dependent on the x-coordinate (i.e., the longitudinal coordinate) of the object in the coordinate system of the radar sensor (i.e., the coordinate system relative to the radar sensor.

In FIG. 3, a radar sensor 14 has an unknown amount of elevation misalignment (i.e., the radar sensor's x-axis or the radar sensor's principal direction of sensing 22 is not parallel to the axis 24). In this case, the z-coordinate of the object depends on the x-coordinate for several measurements at different distances between the vehicle and the object:

$$z_i = x_i \times tg(\propto) + C + n_i \qquad (3)$$

In Equation (3), $z_i$ represents the z-coordinate of the object in the radar sensor frame, $x_i$ represents the x-coordinate of the object in the radar sensor frame, $n_i$ represents a measurement noise, i represents an experiment index, $tg(\propto)$ represents the tangent of angular misalignment of the radar sensor from an imaginary line parallel to ground, and C represents a constant offset. Equation (3) builds a linear system for measuring misalignment at different distances, which can be solved for using $a=tg(\propto)$ and C. That is, elevation misalignment $(\propto_e)$ may be obtained from:

$$\propto_e = a\tan(a) \qquad (4)$$

Using Equation (3) and Equation (4), the minimal number of different distances required for resolution is two. That is, the object must be detected/measured at two or more different distances from the vehicle/radar sensor. For example, in FIG. 3, the object is measured by the radar sensor 14 of the vehicle 10 when the object is at each of the locations 30A, 30B, 30C. When the object is measured at location 30A, the object has, in the radar sensor's coordinate system, a location of X1, Z1. Similarly, when the object is at location 30B relative to the vehicle, the object has a location X2, Z2 and when the object is at location 30C relative to the vehicle, the object has a location of X3, Z3. That is, due to the elevation misalignment of the radar sensor 14, as the object moves relative to the vehicle parallel to the ground (i.e., maintaining the same z-coordinate in the vehicle's coordinate system), the object's location changes both vertically and longitudinally (represented by changes in both the x-coordinate and the z-coordinate) in the radar sensor's coordinate system. Notably, in this example, if the radar sensor had no elevation misalignment, an object that moves parallel to the ground would have an x-coordinate in the radar sensor's coordinate system that changes but a z-coordinate that does not change.

Solving the linear system, as described previously with respect to azimuth misalignment, may be accomplished analytically or numerically, depending on the number of equations. Larger numbers of equations (i.e., measuring the object at more locations and solving the resulting linear system) results in better noise suppression. Accordingly, the object may be measured at any number of locations relative to the vehicle with a tradeoff between accuracy and test complexity. Solving the linear system results in an elevation misalignment factor. The elevation misalignment factor may be used to calibrate the radar sensor (e.g., alone or along with the azimuth misalignment factor). For example, the elevation misalignment factor is stored in memory disposed at the vehicle and is used to compensate for the misalignment by processing radar data captured by the radar sensor in accordance with the elevation misalignment factor. Optionally, the system saves/stores all data in memory of the radar sensor and processes the data using embedded software executed by the radar sensor.

As discussed with respect to the azimuth misalignment factor, any combination of physical and/or virtual targets may be used. The vehicle may be moved relative to the targets or the targets may be moved relative to the vehicle. Optionally, the radar calibrator uses one or more virtual targets (e.g., via a virtual radar target generator) in addition to or alternative to physical targets/objects to determine the elevation misalignment factor.

Thus, in some implementations, the radar calibrator calibrates or corrects or compensates for azimuth misalignment and/or for elevation misalignment for one or more radar sensors of a vehicle. The radar calibrator determines, for each respective radar sensor to be calibrated, a location of an object with respect to the respective radar sensor using radar data captured by the radar sensor. For example, the radar sensor data is retrieved from the vehicle and provided to an external computing device (e.g., via wired or wireless communication). Alternatively, the radar calibrator at least partially executes at the vehicle (e.g., at an ECU of the vehicle) and receives the radar data from the radar sensor. The object (e.g., a radar-reflective target) is then moved along a longitudinal axis of the vehicle to a different distance from the vehicle (i.e., closer or farther away from the vehicle) or the vehicle is moved relative to the object. Once the object is at a new distance from the vehicle, the radar calibrator again determines the location of the object with respect to the respective radar sensor. This may be repeated to capture any number of location measurements. Using each of the location measurements, an azimuth misalignment factor and/or an elevation misalignment factor is determined. For example, a linear system generated from the location measurements is solved analytically or numerically. Using the azimuth misalignment factor and elevation misalignment factor, the radar sensor may be calibrated. Thus, the radar calibrator may calibrate for azimuth misalignment and/or elevation misalignment in a cost effective manner without expensive testing equipment. The object may be any object suitable for detection by the radar sensor(s) (e.g., a corner spherical reflector fixed to a tripod). The radar calibrator may receive the radar sensor data (e.g., the coordinates of the detected object) via a vehicle data bus (e.g., a CAN bus). The object may be moved relative to the vehicle and/or the vehicle may be moved relative to the object.

The radar sensor or sensors may be disposed at the vehicle so as to sense exterior of the vehicle. For example, the radar sensor may comprise a front sensing radar sensor mounted at a grille or front bumper of the vehicle, such as for use with an automatic emergency braking system of the vehicle, an adaptive cruise control system of the vehicle, a collision avoidance system of the vehicle, etc., or the radar sensor may be comprise a corner radar sensor disposed at a front corner or rear corner of the vehicle, such as for use with a surround vision system of the vehicle, or the radar sensor may comprise a blind spot monitoring radars disposed at a rear fender of the vehicle for monitoring sideward/rearward of the vehicle for a blind spot monitoring and alert system of the vehicle. Optionally, the radar sensor or sensors may be disposed within the vehicle so as to sense interior of the vehicle, such as for use with a cabin monitoring system of the vehicle or a driver monitoring system of the vehicle or an occupant detection or monitoring system of the vehicle. The radar sensing system may comprise multiple input multiple output (MIMO) radar sensors having multiple transmitting antennas and multiple receiving antennas.

The system utilizes radar sensors to detect presence of and/or range to objects and/or other vehicles and/or pedestrians. The sensing system may utilize aspects of the systems described in U.S. Pat. Nos. 10,866,306; 9,954,955; 9,869, 762; 9,753,121; 9,689,967; 9,599,702; 9,575,160; 9,146, 898; 9,036,026; 8,027,029; 8,013,780; 7,408,627; 7,405, 812; 7,379,163; 7,379,100; 7,375,803; 7,352,454; 7,340, 077; 7,321,111; 7,310,431; 7,283,213; 7,212,663; 7,203, 356; 7,176,438; 7,157,685; 7,053,357; 6,919,549; 6,906, 793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a vehicular radar system, the method comprising:

obtaining a vehicle comprising a radar sensor of the vehicular radar system, the radar sensor sensing exterior of the vehicle, wherein the radar sensor has a principal axis of sensing, and wherein the radar sensor has a misalignment representing a difference between the principal axis of sensing of the radar sensor and an intended principal axis of sensing for the radar sensor;

positioning an object at a first location relative to the radar sensor on the intended principal axis of sensing for the radar sensor, wherein the first location has a first distance between the object and the radar sensor;

capturing, via the radar sensor, sensor data with the object at the first location;

determining, via processing by a data processor of sensor data captured by the radar sensor with the object at the first location, a first sensed location of the object relative to the radar sensor;

changing the location of the object relative to the radar sensor along the intended principal axis of sensing for the radar sensor from the first location to a second location relative to the radar sensor, wherein the second location has a second distance between the object and the radar sensor that is different than the first distance between the object and the radar sensor;

capturing, via the radar sensor, sensor data with the object at the second location;

determining, via processing by the data processor of sensor data captured by the radar sensor with the object at the second location, a second sensed location of the object relative to the radar sensor;

determining the misalignment of the radar sensor based at least in part on the first sensed location of the object and the second sensed location of the object; and calibrating the vehicular radar system based at least in part on the determined misalignment of the radar sensor.

2. The method of claim 1, wherein calibrating the vehicular radar system comprises storing, at memory included in the vehicle, a correction value based on the determined misalignment of the radar sensor.

3. The method of claim 1, wherein determining the misalignment of the radar sensor comprises (i) determining a first linear equation based on the first sensed location, (ii) determining a second linear equation based on the second sensed location and (iii) solving the first linear equation and the second linear equation.

4. The method of claim 1, further comprising changing the location of the object relative to the radar sensor along the intended principal axis of sensing for the radar sensor to a third location relative to the radar sensor and determining, via processing by the data processor of sensor data captured by the radar sensor with the object at the third location, a third sensed location of the object relative to the radar sensor, and wherein determining the misalignment of the radar sensor is based in part on the third sensed location.

5. The method of claim 1, wherein the object comprises a spherical reflector.

6. The method of claim 1, wherein the object comprises a virtual object generated using a virtual radar target generator, and wherein changing the location of the object relative to the radar sensor comprises simulating movement of the virtual object.

7. The method of claim 1, wherein changing the location of the object relative to the radar sensor along the intended principal axis of sensing for the radar sensor from the first location relative to the radar sensor to the second location relative to the radar sensor comprises moving the vehicle along the intended principal axis of sensing for the radar sensor relative to the object.

8. The method of claim 1, wherein the intended principal axis of sensing for the radar sensor is parallel to a longitudinal axis of the vehicle.

9. The method of claim 1, wherein the intended principal axis of sensing for the radar sensor is parallel to the ground.

10. The method of claim 1, wherein the misalignment of the radar sensor comprises an azimuth misalignment.

11. The method of claim 1, wherein the misalignment of the radar sensor comprises an elevation misalignment.

12. A method for calibrating a vehicular radar system, the method comprising:

obtaining a vehicle comprising a radar sensor of the vehicular radar system, the radar sensor sensing exterior of the vehicle, wherein the radar sensor has a principal axis of sensing, and wherein the radar sensor has an azimuth misalignment representing a difference between the principal axis of sensing of the radar sensor and an intended principal axis of sensing for the radar sensor;

positioning a first object at a first location relative to the radar sensor on the intended principal axis of sensing for the radar sensor, wherein the first location has a first distance between the first object and the radar sensor;

capturing, via the radar sensor, sensor data with the first object at the first location;

determining, via processing by a data processor of sensor data captured by the radar sensor with the first object at the first location, a first sensed location of the first object relative to the radar sensor;

positioning a second object at a second location relative to the radar sensor on the intended principal axis of sensing for the radar sensor, wherein the second location has a second distance between the second object and the radar sensor that is different than the first distance between the first object and the radar sensor;

capturing, via the radar sensor, sensor data with the second object at the second location;

determining, via processing by the data processor of sensor data captured by the radar sensor with the second object at the second location, a second sensed location of the second object relative to the radar sensor;

determining the azimuth misalignment of the radar sensor based at least in part on the first sensed location of the first object and the second sensed location of the second object; and calibrating the vehicular radar system based at least in part on the determined azimuth misalignment of the radar sensor.

13. The method of claim 12, wherein the first object and the second object are different objects.

14. The method of claim 12, wherein positioning the second object at the second location comprises moving the first object from the first location to the second location.

15. The method of claim 12, wherein calibrating the vehicular radar system comprises storing, at memory included in the vehicle, an azimuth correction value based on the determined azimuth misalignment of the radar sensor.

16. The method of claim 12, wherein determining the azimuth misalignment of the radar sensor comprises (i) determining a first linear equation based on the first sensed location, (ii) determining a second linear equation based on the second sensed location and (iii) solving the first linear equation and the second linear equation.

17. The method of claim 12, wherein the intended principal axis of sensing for the radar sensor is parallel to a longitudinal axis of the vehicle.

18. A method for calibrating a vehicular radar system, the method comprising:

obtaining a vehicle comprising a radar sensor of the vehicular radar system, the radar sensor sensing exterior of the vehicle, wherein the radar sensor has a principal axis of sensing, and wherein the radar sensor has an elevation misalignment representing a difference between the principal axis of sensing of the radar sensor and an intended principal axis of sensing for the radar sensor;

positioning an object at a first location relative to the radar sensor on the intended principal axis of sensing for the radar sensor, wherein the first location has a first distance between the object and the radar sensor;

capturing, via the radar sensor, sensor data with the object at the first location;

determining, via processing by a data processor of sensor data captured by the radar sensor with the object at the first location, a first sensed location of the object relative to the radar sensor;

changing the location of the radar sensor relative to the object along the intended principal axis of sensing for the radar sensor from the first location to a second location relative to the object wherein the second location has a second distance between the object and the radar sensor that is different than the first distance between the object and the radar sensor;

capturing, via the radar sensor, sensor data with the object at the second location;

determining, via processing by the data processor of sensor data captured by the radar sensor with the object at the second location, a second sensed location of the object relative to the radar sensor;

determining the elevation misalignment of the radar sensor based at least in part on the first sensed location of the object and the second sensed location of the object; and calibrating the vehicular radar system based at least in part on the determined elevation misalignment of the radar sensor.

19. The method of claim 18, wherein the object comprises a spherical reflector.

20. The method of claim 18, wherein the intended principal axis of sensing for the radar sensor is parallel to the ground.

* * * * *